United States Patent Office 3,671,276
Patented June 20, 1972

3,671,276
OPTICAL FLUOROPHOSPHATE GLASS HAVING AN ANOMALOUS PARTIAL DISPERSION RATIO
Heinz Bromer, Hermannstein, and Norbert Meinert, Wetzlar, Germany, assignors to Ernst Leitz GmbH
No Drawing. Continuation-in-part of application Ser. No. 603,978, Dec. 22, 1966. This application June 26, 1969, Ser. No. 836,965
Claims priority, application Germany, June 27, 1968, P 17 71 692.6
The portion of the term of the patent subsequent to Jan. 27, 1987, has been disclaimed
Int. Cl. C03c 3/00
U.S. Cl. 106—47 Q     5 Claims

ABSTRACT OF THE DISCLOSURE

An optical glass having an anomalous partial dispersion ratio is disclosed which is melted from a mixture consisting essentially of about 58.6–73.8 mol percent of the fluorides of the alkaline-earth metals: magnesium, calcium, strontium and barium, further of about 5.9–21.8 mol percent of the metaphosphates of the alkaline-earth metals: magnesium, strontium, calcium, barium and of aluminum, about 6.3–7.6 mol percent of magnesium oxide and of at least one of the following compounds: $BaT:F_6$ and $K_2TiF_6$.

CROSS REFERENCE TO A RELATED APPLICATION

The present application is a continuation-in-part of application Ser. No. 603,978, filed Dec. 22, 1966, now U.S. Pat. 3,492,136.

The present invention relates to optical glasses having an anomalous partial dispersion ratio.

In our co-pending application Ser. No. 603,978 glasses are disclosed which are melted from mixtures consisting of 70 to 85 mol percent of the fluorides of the alkaline-earth metals: magnesium, calcium, strontium and barium, of 10 to 25 mol percent of the metaphosphates of the alkaline-earth metals: magnesium, calcium, strontium, barium and of aluminum, and of up to 10 mol percent of at least one of the compounds: $KAsO_3$, $K_2TaF_7$ and/or $K_2TiF_6$. To the batch composition can be added up to 3 mol percent of $LaPO_4$ in order to vary the optical basic values, such as the average refractive index $(n_e)$ and the Abbé number $(v_e)$.

Glasses which are made in accordance with the disclosure of our above mentioned application have all an anomalous partial dispersion ratio, as is well known from optical glasses containing fluoro compounds. It is a particular advantage of such glasses that their melt can be reduced to relatively low temperatures. Only thereby a perfect homogenization of the melts is ensured, prior to casting.

We have now found that this property can be further improved if to the batch compositions up to 25 mol percent of the oxide and/or fluoride of antimony is added, preferably partially replacing the metaphosphates. However, the proportion of metaphosphates still present is not to be reduced below 5.9 mol percent, while the proportion of the oxide of antimony is not to exceed 4.7 mol percent.

An increase of the average refractive index $(n_e)$ of the glasses can be achieved without reducing the vitrifying properties by adding the oxide or fluoride of yttrium. According to the invention the proportion of these oxides and/or fluorides of yttrium can range up to 15 mol percent. However, the proportion of the yttrium oxide is not to exceed 6.3 mol percent.

In the following tables are listed various examples of the novel glasses with the oxide of the alkaline-earth metal magnesium, 6.3–7.6 mol percent being added to the metaphosphates or fluorides of such metal.

Preferably, the oxide of magnesium has been employed. Further, in addition to the compounds $KAsO_3$, $K_2TaF_7$ and/or $K_2TiF_6$ also the compound $BaTiF_6$ has been used.

Table 1 shows the effect of the substitution of the oxide or fluoride respectively of antimony for the metaphosphates.

Table 2 illustrates the effect of the oxide or fluoride respectively of yttrium on the optical values of the glasses. As the basic batch composition has been selected the Example 1 of Table 1. To this basic composition the oxide of yttrium has been added in the Examples 11 and 12 in a total proportion of 5% by weight and 10% by weight respectively. In Examples 13 to 18 the phosphates of the basic composition have been replaced by yttrium oxide and yttrium fluoride respectively.

In Table 3 is shown the use of $BaTiF_6$.

3,671,276

TABLE 1

| Melt No. | 1 Mol percent | 1 Percent by wt. | 2 Mol percent | 2 Percent by wt. | 3 Mol percent | 3 Percent by wt. | 4 Mol percent | 4 Percent by wt. | 5 Mol percent | 5 Percent by wt. | 6 Mol percent | 6 Percent by wt. | 7 Mol percent | 7 Percent by wt. | 8 Mol percent | 8 Percent by wt. | 9 Mol percent | 9 Percent by wt. | 10 Mol percent | 10 Percent by wt. |
|---|---|---|---|---|---|---|---|---|---|---|---|---|---|---|---|---|---|---|---|---|
| $Al(PO_3)_3$ | 14.6 | 27.9 | 15.5 | 27.9 | 14.7 | 27.9 | 11.1 | 21.1 | 12.8 | 24.9 | 8.1 | 16.1 | 3.0 | 6.1 | 7.2 | — | 5.6 | 11.1 | 3.1 | 6.1 |
| $Mg(PO_3)_2$ | 3.0 | 4.0 | 3.2 | 4.0 | 3.0 | 4.0 | 3.1 | 4.0 | 3.0 | 4.0 | 2.9 | 4.0 | 2.9 | 4.0 | — | 10.1 | — | — | 3.0 | 4.0 |
| $Ca(PO_3)_2$ | 2.2 | 3.2 | 2.3 | 3.2 | — | — | — | — | — | — | — | — | — | — | 3.3 | 5.0 | — | — | — | — |
| $Ba(PO_3)_2$ | — | — | — | — | — | — | — | — | — | — | — | — | — | — | 2.2 | — | — | — | — | — |
| MgO | 6.9 | 2.0 | 7.3 | 2.0 | 6.9 | 2.0 | 7.0 | 2.0 | 6.8 | 2.0 | 6.7 | 2.0 | 6.5 | 2.0 | 6.5 | 2.0 | 1.9 | 2.0 | 6.8 | 2.0 |
| $MgF_2$ | 15.3 | 6.9 | 16.2 | 6.9 | 15.4 | 6.9 | 15.4 | 6.9 | 15.1 | 6.9 | 14.8 | 6.9 | 14.4 | 6.9 | 14.5 | 6.9 | 6.6 | 6.9 | 15.2 | 6.9 |
| $CaF_2$ | 12.3 | 7.0 | 3.7 | 7.0 | 12.5 | 7.0 | 12.5 | 7.0 | 12.2 | 7.0 | 12.0 | 7.0 | 11.7 | 7.0 | 11.8 | 7.0 | 14.7 | 7.0 | 15.2 | 7.0 |
| $SrF_2$ | 26.0 | 23.8 | 27.6 | 23.8 | 26.2 | 23.8 | 26.2 | 23.8 | 25.8 | 23.8 | 25.3 | 23.8 | 24.4 | 23.8 | 24.8 | 23.8 | 12.0 | 23.8 | 25.7 | 23.8 |
| $BaF_2$ | 19.4 | 24.7 | 22.6 | 27.2 | 19.5 | 24.7 | 19.6 | 24.7 | 19.2 | 24.7 | 18.8 | 24.7 | 18.4 | 24.7 | 18.4 | 24.7 | 18.7 | 24.7 | 19.3 | 24.7 |
| $BaTiF_6$ | — | — | 1.3 | 0.5 | 1.5 | 0.5 | — | — | — | — | — | — | — | — | 0.3 | 0.5 | 0.3 | 0.5 | 0.3 | 0.5 |
| $Sb_2O_3$ | 0.3 | 0.5 | — | — | — | — | 4.7 | 10.0 | 4.8 | 6.2 | 11.2 | 15.0 | 18.2 | 25.0 | 11.0 | 15.0 | 14.9 | 20.0 | 23.0 | 30.0 |
| $K_3TiF_6$ | — | — | — | — | — | — | — | — | — | — | — | — | — | — | — | — | — | — | — | — |
| $n_e$ | 1.5441 | | 1.5488 | | 1.5384 | | 1.5413 | | 1.5349 | | 1.5208 | | 1.5014 | | 1.5157 | | 1.5098 | | 1.5055 | |
| $v_e$ | 72.9 | | 71.8 | | 72.9 | | 72.8 | | 73.7 | | 75.6 | | 77.7 | | 75.1 | | 76.4 | | 77.9 | |
| $\vartheta'_g$ (×10⁻⁴) | 4840 | | 4790 | | 4844 | | 4825 | | 4821 | | 4833 | | 4822 | | 4920 | | 4787 | | 4817 | |
| $\Delta v_e$ | +14.5 | | +9.9 | | +14.8 | | +13.3 | | +14.0 | | +17.7 | | +18.0 | | +22.3 | | +14.0 | | +17.2 | |

TABLE 2

| Melt No. | 11 Mol percent | 11 Percent by wt. | 12 Mol percent | 12 Percent by wt. | 13 Mol percent | 13 Percent by wt. | 14 Mol percent | 14 Percent by wt. | 15 Mol percent | 15 Percent by wt. | 16 Mol percent | 16 Percent by wt. | 17 Mol percent | 17 Percent by wt. | 18 Mol percent | 18 Percent by wt. |
|---|---|---|---|---|---|---|---|---|---|---|---|---|---|---|---|---|
| $Al(PO_3)_3$ | 14.1 | 26.5 | 13.6 | 25.1 | 14.6 | 27.9 | 13.9 | 24.9 | 11.0 | 21.1 | 12.7 | 24.9 | 10.6 | 21.1 | 7.9 | 16.1 |
| $Mg(PO_3)_2$ | 3.0 | 3.8 | 2.9 | 3.6 | 3.0 | 4.0 | 3.0 | 4.0 | 3.0 | 4.0 | 3.0 | 4.0 | 3.0 | 4.0 | 2.9 | 4.0 |
| $Ca(PO_3)_2$ | 2.1 | 2.9 | 2.1 | 2.9 | — | — | — | — | — | — | — | — | — | — | — | — |
| $Ba(PO_3)_2$ | 6.6 | 4.9 | 6.4 | 4.8 | — | — | — | — | — | — | — | — | — | — | — | — |
| MgO | 6.7 | 2.0 | 6.5 | 2.0 | 6.9 | 2.0 | 6.9 | 2.0 | 6.9 | 2.0 | 6.7 | 2.0 | 6.6 | 2.0 | 6.5 | 2.0 |
| $MgF_2$ | 14.9 | 6.9 | 14.3 | 6.2 | 15.3 | 6.9 | 15.3 | 6.9 | 15.3 | 7.0 | 15.0 | 7.0 | 14.7 | 6.9 | 14.4 | 6.9 |
| $CaF_2$ | 12.1 | 7.0 | 11.6 | 7.0 | 12.4 | 7.0 | 12.4 | 7.0 | 12.5 | 7.0 | 12.1 | 7.0 | 12.0 | 7.0 | 11.7 | 7.0 |
| $SrF_2$ | 25.2 | 23.8 | 24.4 | 23.8 | 26.2 | 23.8 | 26.0 | 23.8 | 25.9 | 23.8 | 25.5 | 23.8 | 25.1 | 23.8 | 24.6 | 23.8 |
| $BaF_2$ | 18.5 | 23.6 | 18.3 | 22.3 | 19.4 | 24.7 | 19.4 | 24.7 | 19.3 | 24.7 | 19.0 | 24.7 | 18.7 | 24.7 | 18.3 | 24.7 |
| $BaTiF_6$ | 0.3 | 0.5 | 0.1 | 0.4 | 0.3 | 0.5 | 0.3 | 0.5 | 0.3 | 0.5 | 0.3 | 0.5 | 0.3 | 0.5 | 0.3 | 0.5 |
| $Y_2O_3$ | — | — | — | — | — | — | — | — | — | — | — | — | — | — | — | — |
| $YF_3$ | 3.1 | 5.0 | 6.3 | 10.0 | 1.9 | 3.2 | 3.7 | 6.2 | 6.0 | 10.0 | 5.7 | 6.2 | 9.0 | 10.0 | 13.4 | 15.0 |
| $n_e$ | 1.5508 | | 1.5562 | | 1.54.2 | | 1.5439 | | 1.5408 | | 1.5342 | | 1.5303 | | 1.5247 | |
| $v_e$ | 7.95 | | 7.14 | | 72.7 | | 7.27 | | 73.2 | | 74.2 | | 74.6 | | 75.7 | |
| $\vartheta'_g$ (×10⁻⁴) | 4805 | | 4820 | | 4819 | | 4813 | | 4790 | | 4826 | | 4852 | | 4762 | |
| $\Delta v_e$ | +10.6 | | +12.6 | | +12.6 | | +12.4 | | +12.3 | | +14.8 | | +17.0 | | +11.8 | |

TABLE 3

| Melt No. | 19 Mol percent | 19 Percent by wt. | 20 Mol percent | 20 Percent by wt. | 21 Mol percent | 21 Percent by wt. | 22 Mol percent | 22 Percent by wt. | 23 Mol percent | 23 Percent by wt. | 24 Mol percent | 24 Percent by wt. | 25 Mol percent | 25 Percent by wt. | 26 Mol percent | 26 Percent by wt. | 27 Mol percent | 27 Percent by wt. |
|---|---|---|---|---|---|---|---|---|---|---|---|---|---|---|---|---|---|---|
| $Al(PO_3)_3$ | 14.6 | 27.9 | 14.8 | 27.9 | 15.5 | 27.9 | 16.1 | 27.9 | 13.9 | 25.4 | 13.9 | 25.9 | 13.8 | 25.4 | 13.7 | 24.8 | 13.6 | 24.3 |
| $Mg(PO_3)_2$ | 3.0 | 4.0 | 3.1 | 4.0 | 3.2 | 4.0 | 3.3 | 4.0 | 2.9 | 3.6 | 3.1 | 3.7 | 3.0 | 3.6 | 3.0 | 3.6 | 3.0 | 3.5 |
| $Ca(PO_3)_2$ | 2.2 | 3.2 | 2.2 | 3.2 | 2.3 | 3.2 | 2.4 | 3.3 | 2.2 | 2.9 | 2.2 | 2.9 | 2.2 | 2.9 | 2.1 | 2.8 | 2.1 | 2.8 |
| $Ba(PO_3)_2$ | — | — | — | — | — | — | — | — | 6.5 | 4.9 | 6.6 | 1.9 | 6.5 | 1.8 | 6.4 | 1.8 | 6.3 | 1.7 |
| MgO | 6.9 | 2.0 | 7.0 | 2.0 | 7.3 | 2.0 | 7.6 | 2.0 | 14.7 | 6.4 | 14.4 | 6.4 | 14.3 | 6.4 | 14.1 | 6.2 | 14.0 | 6.1 |
| $MgF_2$ | 15.3 | 6.9 | 15.6 | 6.9 | 16.3 | 6.9 | 16.8 | 6.9 | 11.9 | 6.8 | 11.8 | 6.5 | 11.7 | 6.4 | 11.5 | 6.2 | 11.4 | 6.1 |
| $CaF_2$ | 12.4 | 7.0 | 10.0 | 6.5 | 4.7 | 3.2 | — | — | 24.9 | 22.1 | 24.9 | 22.1 | 24.7 | 21.6 | 24.4 | 21.0 | 24.2 | 20.7 |
| $SrF_2$ | 26.0 | 23.8 | 26.5 | 23.8 | 27.6 | 23.8 | 28.6 | 23.8 | 18.6 | 23.0 | 18.3 | 23.0 | 18.2 | 22.5 | 18.0 | 22.0 | 17.8 | 21.5 |
| $BaF_2$ | 19.3 | 24.7 | 19.8 | 24.7 | 20.6 | 24.7 | 21.5 | 24.7 | 4.5 | 0.5 | 1.3 | 0.5 | 2.2 | 4.5 | 3.4 | 6.7 | 4.2 | 8.7 |
| $BaTiF_6$ | 0.3 | 0.5 | 1.0 | 1.0 | 2.5 | 2.5 | 3.8 | 7.5 | — | — | — | — | 0.4 | — | 0.4 | 0.4 | 0.4 | 0.4 |
| $K_3TiF_6$ | — | — | — | — | — | — | — | — | — | — | — | — | — | — | — | — | — | — |
| $Y_2O_3$ | — | — | — | — | — | — | — | — | — | — | 3.1 | 4.7 | 3.0 | 4.5 | 3.0 | 4.4 | 3.0 | 4.3 |
| $n_e$ | 1.5465 | | 1.5483 | | 1.5569 | | 1.5570 | | 1.5529 | | 1.5459 | | 1.5530 | | 1.5576 | | 1.5556 | |
| $v_e$ | 72.4 | | 70.4 | | 67.5 | | 62.3 | | 62.60 | | 69.5 | | 67.7 | | 65.1 | | 62.6 | |
| $\vartheta'_g$ (×10⁻⁴) | 4795 | | 4788 | | 4909 | | 4932 | | 4994 | | 4835 | | 4508 | | 4882 | | 4977 | |
| $\Delta v_e$ | +10.8 | | +7.6 | | +13.9 | | +10.4 | | +14.9 | | +10.7 | | +14.1 | | +10.3 | | +13.8 | |

Example of the melting process; Composition of the mixture

|  | Percent by Wt. | Mol percent |
| --- | --- | --- |
| $Mg(PO_3)_2$ | 4.0 | 4.4 |
| $Al(PO_3)_3$ | 22.9 | 12.3 |
| $Ca(PO_3)_2$ | 3.2 | 2.3 |
| $MgO$ | 2.0 | 7.1 |
| $MgF_2$ | 6.9 | 15.7 |
| $CaF_2$ | 7.0 | 12.8 |
| $SrF_2$ | 8.8 | 10.0 |
| $BaF_2$ | 24.7 | 20.1 |
| $BaTiF_6$ | 0.5 | 0.2 |
| $Y_2O_3$ | 5.0 | 3.2 |
| $SbF_3$ | 15.0 | 11.9 |

The mixture of about 750 g. is molten at 1000° C. and is subsequently refined for about 10 minutes at a temperature of 1100° C. Thereafter, the temperature is gradually reduced to 1000° C. at which temperature the melt is stirred for about 20 minutes. While stirring is continued without further heating the temperature of the melt is further reduced until a film appears on the surface. At this temperature the melt is poured into carbon-molds which have been preheated to 400° C. Thereafter, the molds are placed in an annealing furnace which has been preheated to 460° C.

The optical values of the glass are:

$n_e$ -------------------------------- 1.5542
$v_e$ -------------------------------- 66.7
$\wp'$ -------------------------------- 0.4874
$\Delta v_e$ -------------------------------- +10.7

What we claim is:

1. Optical fluorophosphate glasses having anomalous partial dispersion values between $\Delta v_e = +7.6$ and $\Delta v_e = +22.3$ which are melted from a mixture consisting essentially of:

(a) between about 58.6 and 73.8 mol percent of fluorides of the alkaline-earth metals magnesium, calcium, strontium and barium;

(b) between about 5.9 and 21.8 mol percent of at least two metaphosphates of the alkaline-earth metals magnesium, calcium and barium as well as aluminum;

(c) between about 6.3 and 7.6 mol percent of magnesium oxide; and (d) at least one of the compounds $BaTiF_6$ and $K_2TiF_6$, the total of said compounds amounting to about 0.1 to 4.6 mol percent, wherein the amount of $K_2TiF_6$ doesn't exceed 0.4 mol percent.

2. Optical fluorophosphate glasses as defined in claim 1, further containing about 4.8 to 23 mol percent $SbF_3$.

3. Optical fluorophosphate glasses as defined in claim 1, further containing about 1.3 to 4.7 mol percent $Sb_2O_3$.

4. Optical fluorophosphate glasses as defined in claim 1, further containing about 5.7 to 13.4 mol percent $YF_3$.

5. Optical fluorophosphate glasses as defined in claim 1, further containing about 1.9 to 6.3 mol percent $Y_2O_3$.

References Cited

UNITED STATES PATENTS

| 2,716,069 | 8/1955 | Pincus | 106—47 Q |
| 3,068,108 | 12/1962 | Geffcken | 106—47 Q |
| 3,081,178 | 3/1963 | Weissenberg et al. | 106—47 Q |
| 3,492,136 | 1/1970 | Bromer et al. | 106—47 Q |
| 3,281,254 | 10/1966 | Weidel | 106—47 Q |

FOREIGN PATENTS

| 781,243 | 8/1957 | Great Britain | 106—47 Q |

TOBIAS E. LEVOW, Primary Examiner

W. R. SATTERFIELD, Assistant Examiner

U.S. Cl. X.R.

106—47 R

UNITED STATES PATENT OFFICE
CERTIFICATE OF CORRECTION

Patent No. 3,671,276        Dated    June 20, 1972

Inventor(s) HEINZ BRÖMER & NORBERT MEINERT

It is certified that error appears in the above-identified patent and that said Letters Patent are hereby corrected as shown below:

Column 1, line 5, "Heinz Bromer" should read --Heinz Brömer--.

Column 1, line 29, "BaT:$F_6$" should read --$BaTiF_6$--.

Columns 3 and 4, Table 2, under Melt No.; "$Y_2O$" should read --$Y_2O_3$--.

Columns 3 and 4, Table 2, under 11, "$v_e = 7.95$" should read --$v_e = 71.5$--.

Columns 3 and 4, Table 2, under 12, "$v_e = 7.14$" should read --$v_e = 71.4$--; and "$\Delta v_e +12.6$" should read --$\Delta v_e = +12.4$--.

Columns 3 and 4, Table 2, under 13, "$n_e = 1.54.2$" should read --$n_e = 1.5412$--; and "$\Delta v_e = +12.6$" should read --$\Delta v_e = +12.9$--.

Columns 3 and 4, Table 2, under 14, "$Al(PO_3)_3 = 13.9$" should read --$Al(PO_3)_3 = 13.0$--; and "$v_e = 7.27$" should read --$v_e = 72.7$--.

Column 5, line 29, "$\vartheta'$" should read --$\vartheta'_g$--.

Signed and sealed this 9th day of January 1973.

(SEAL)

Attest:

EDWARD M. FLETCHER, JR.
Attesting Officer

ROBERT GOTTSCHALK
Commissioner of Patents